(12) United States Patent
Weber et al.

(10) Patent No.: US 7,602,142 B2
(45) Date of Patent: Oct. 13, 2009

(54) SYSTEM FOR INDUCTIVE POWER TRANSFER

(75) Inventors: Charles F. Weber, Dexter, MI (US);
Bruce S. Green, Dearborn, MI (US); CT Thomas Clark, Redford, MI (US);
Charlie A. Richlie, Northville, MI (US);
Gary Tkaczyk, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 379 days.

(21) Appl. No.: 11/695,428

(22) Filed: Apr. 2, 2007

(65) Prior Publication Data

US 2008/0238364 A1 Oct. 2, 2008

(51) Int. Cl.
*H01M 10/46* (2006.01)
(52) U.S. Cl. ..................................... 320/108
(58) Field of Classification Search ................. 320/108, 320/112, 114, 132, 137, 140
See application file for complete search history.

(56) References Cited

U.S. PATENT DOCUMENTS

| | | | |
|---|---|---|---|
| 5,450,305 A * | 9/1995 | Boys et al. ................... 363/24 |
| 5,661,391 A | 8/1997 | Ito et al. | |
| 5,690,693 A * | 11/1997 | Wang et al. ................... 607/61 |
| 5,895,984 A | 4/1999 | Renz | |
| 5,928,505 A | 7/1999 | Inakagata et al. | |
| 5,991,665 A | 11/1999 | Wang et al. | |
| 6,043,633 A | 3/2000 | Lev et al. | |
| 6,972,543 B1 | 12/2005 | Wells | |
| 7,151,357 B2 | 12/2006 | Xian et al. | |
| 2002/0057584 A1 | 5/2002 | Brockmann | |
| 2003/0103039 A1 | 6/2003 | Burr et al. | |
| 2004/0145342 A1 | 7/2004 | Lyon | |
| 2005/0189910 A1 | 9/2005 | Hui | |
| 2006/0071632 A1 | 4/2006 | Ghabra et al. | |
| 2006/0284714 A1 | 12/2006 | Camarena Villasenor | |
| 2007/0024238 A1 | 2/2007 | Nakade et al. | |

* cited by examiner

*Primary Examiner*—Edward Tso
(74) *Attorney, Agent, or Firm*—Dickinson Wright PLLC

(57) ABSTRACT

An inductive power transfer system including a synchronous drive system having a resonance control module. The resonance control module includes a primary coil module with a primary LC circuit. The resonance control module seeks and detects the resonant frequency of the primary LC circuit. The synchronous drive system further includes a switching coil amplifier for selectively energizing the primary coil to keep the primary LC circuit operating at or as close as possible to its natural resonant frequency. The inductive power transfer system may further include a secondary receiving unit. The secondary receiving unit includes a secondary LC circuit coupled with the primary LC circuit for inductively receiving power. The secondary LC circuit includes an LC filter and a rectifier unit for operating the secondary LC circuit at a mutual resonance with the primary LC circuit.

41 Claims, 3 Drawing Sheets

SYSTEM FOR INDUCTIVE POWER TRANSFER

BACKGROUND OF THE INVENTION

1. Field of the Invention

The subject of the invention relates to an inductive power transfer system and more specifically to a synchronous system for inductively transferring power.

2. Description of the Prior Art

Inductive power transfer can be used to power a device and/or charge a remotely located battery without the need for any electrical connection between the device and a power source. Inductive power transfer typically uses a primary coil and a secondary coil. The primary coil may be contained within a primary unit or source connected to an AC (Alternating Current) power source. The secondary coil may be contained in a secondary or receiving system, which may be directly included in, for example a cordless consumer device. When the cordless device is placed near the primary unit, such that the primary coil is in proximity to the secondary coil, power is inductively transferred from the primary coil to the secondary coil. The energy stored by the secondary coil can be utilized to power and/or charge the consumer device.

One problem with inductive power transfer is the lack of spatial freedom between the primary coil and the secondary coil. The efficiency at which the primary coil transfers power to the secondary coil is limited by the distance between the primary unit and the device, including the secondary unit. Operating the primary coil and the secondary coil at mutual frequencies, at or close to resonance, increases the efficiency of the power transfer. It is additionally desirable to adjust the magnitude of oscillation existing at the primary coil to control the magnitude of power transfer from the primary coil to the secondary coil. However, adjusting frequency to operate at resonance and simultaneously controlling amplitude can be problematic. Additionally, using voltage pulses to control the resonance frequency and amplitude can easily generate undesired electromagnetic emissions when inductively coupling a primary coil to a secondary coil. Furthermore, primary and secondary coils intended to couple with a high degree of spatial freedom can easily radiate unwanted electromagnetic energy due to the pulsing form of the control, especially if the secondary coil includes a rectifier circuit having sudden changes in current flowing through the secondary coil. These electromagnetic energies may affect a variety of devices, such as radios in vehicles.

SUMMARY OF THE INVENTION AND ADVANTAGES

The inductive power transfer system including a synchronous drive system provides for a resonance control module having a primary coil module with a primary LC circuit. The resonance control module seeks the resonant frequency of the primary LC circuit and selectively powers the primary LC circuit to keep the primary LC circuit operating at or as close as possible to its natural resonant frequency while varying the magnitude of the power signal delivered to the primary LC circuit.

Not only does the resonance control module seek the resonant frequency to operate the primary LC circuit at or as close as possible to its natural resonance, the primary unit includes the synchronous drive system that controls the magnitude of a power signal used to power the primary LC circuit. Accordingly, the magnitude of the power signal can be adjusted to efficiently transfer power to a device to sufficiently operate the device and/or charge a battery without substantial frequency variations. Additionally, undesired electromagnetic emissions generated by the power signal and emitted by the primary LC circuit are reduced.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
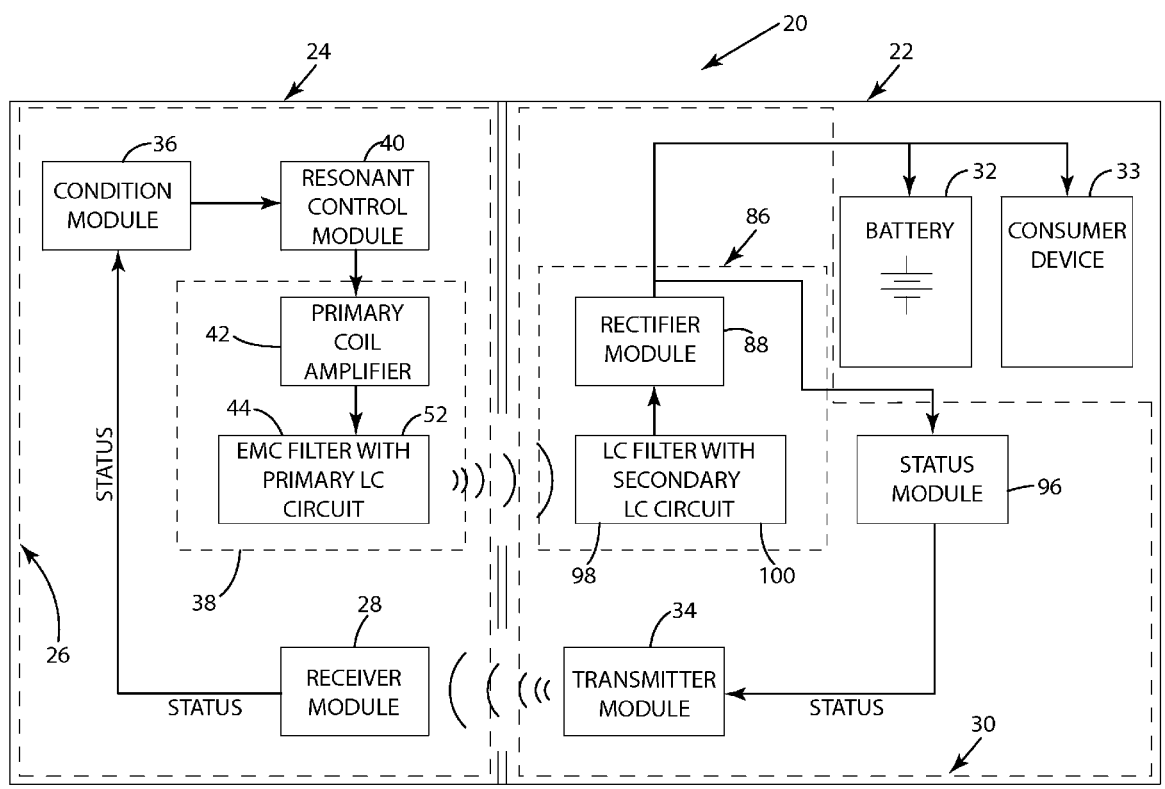
FIG. 1 is a block diagram of the inductive power transfer system including a synchronous drive system in proximity with a secondary receiving system.

Referring to the Figures, wherein like numerals indicate corresponding parts throughout the several views, an inductive power transfer system is generally shown for adjusting the conduction angle of an oscillating circuit. Referring to FIG. 1, the inductive power transfer system 20 includes a primary unit 24 and a secondary unit 22. The primary unit 24 includes a synchronous drive system 26 and the secondary unit 22 includes a secondary receiving system 30. The synchronous drive system 26 inductively powers the secondary receiving system 30, as discussed in greater detail below. The synchronous drive system 26 may further include a receiver module 28 that communicates with the secondary receiving system 30 to receive a status signal (STATUS) indicating power conditions within the secondary unit 22. The secondary unit 22 may include a battery 32 and/or a consumer device that can be charged and/or powered by the secondary receiving system 30. The secondary unit 22 may further include a transmitter module 34 that communicates with the receiver module 28 on the synchronous drive system 26 to communicate the status signal (STATUS). Various methods of communicating the status signal (STATUS) may be used including, but not limited to, RF (radio frequency), Bluetooth, etc.

The synchronous drive system 26 includes a condition module 36 in communication with the receiver module 28 to receive the status signal (STATUS). The condition module 36 outputs a desired oscillation level signal ($V_{DESIRE}$) for setting a desired voltage level of resonance in the primary coil circuit based on status signal (STATUS).

Figure 2:
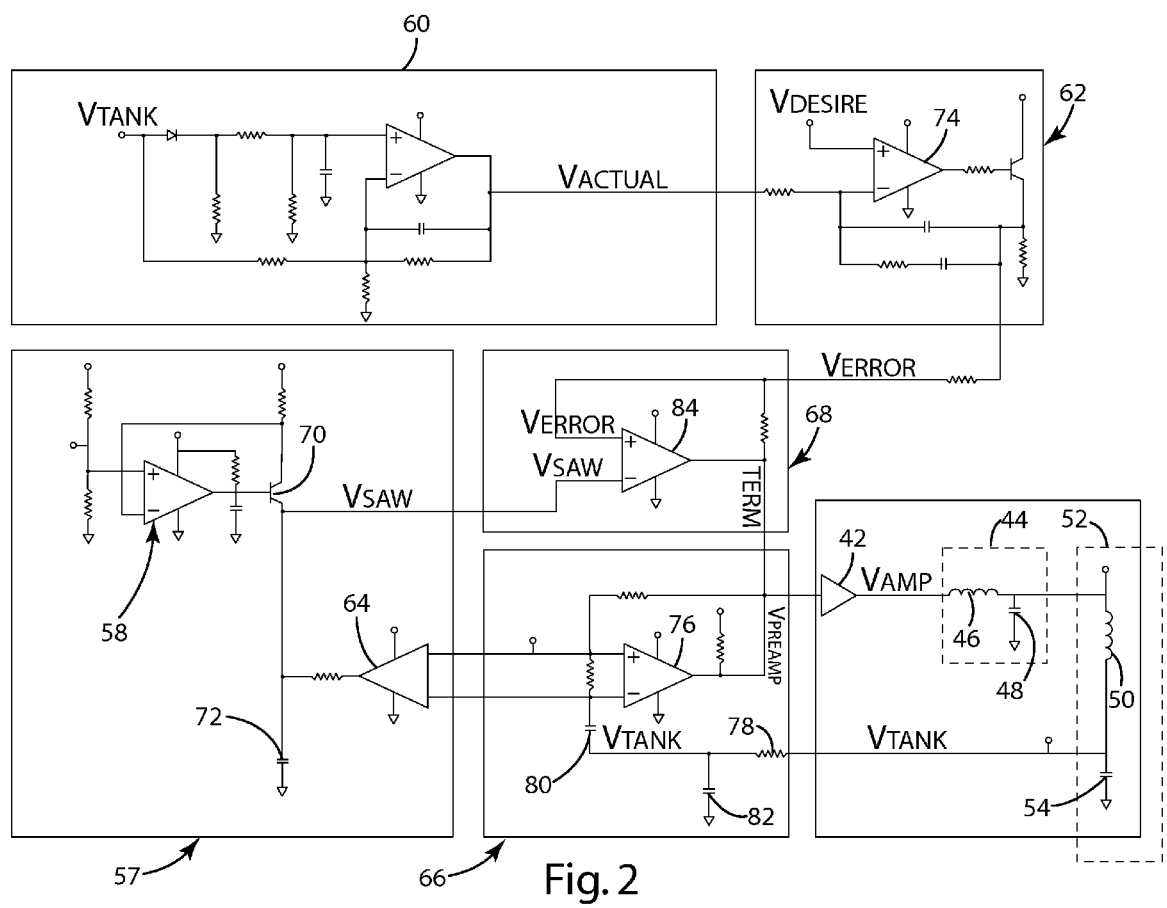
FIG. 2 are electronic circuit schematics of the resonance control module and the primary coil module.

Referring to FIG. 2, the synchronous drive system 26 further includes a resonance control module 40 and a primary coil module 38. The resonance control module 40 is in communication with the condition module 36 and receives the desired resonance amplitude signal ($V_{DESIRE}$). The resonance control module 40 outputs a pre-amplified switching source voltage ($V_{PREAMP}$) based on the signal ($V_{DESIRE}$), as discussed in greater detail below.

The primary coil module 38 communicates with the resonance control module 40 for generating an amplified switching source voltage ($V_{AMP}$) based on the pre-amplified source voltage ($V_{PREAMP}$). The primary coil module 38 includes a switching coil amplifier 42 for amplifying the pre-amplified source voltage ($V_{PREAMP}$). The switching coil amplifier 42 includes an amplifier input for receiving the pre-amplified source voltage ($V_{PREAMP}$) and includes an amplifier output for outputting the amplified source voltage ($V_{AMP}$).

The primary coil module 38 further includes an EMC (electromagnetic compatibility) filter 44 and a primary LC (inductor capacitor) circuit 52. The EMC filter 44 utilizes an EMC coil 46 and an EMC capacitor 48 to filter electronic noise from the amplified source voltage ($V_{AMP}$). The EMC capacitor 48 has one end connected to reference point, such as a ground point, and an opposite end connected to one end of the EMC coil 46. The opposite end of the EMC coil 46 is connected to the amplifier output of the switching coil amplifier 42. The EMC filter 44 suppresses unwanted noise generated by the switching coil amplifier 42 from reaching the tank coil 50 where it can radiate and generate undesired electromagnetic energy.

The primary LC circuit 52 includes a tank capacitor 54 and a tank coil 50. In some embodiments, the tank coil 50 is also referred to as a primary coil. The tank capacitor 54 has one end connected to a reference point and an opposite end in communication with one end of the tank coil 50. The opposite end of the tank coil 50 communicates with one end of each of the EMC coil 46 and the EMC capacitor 48 for receiving the amplified source voltage ($V_{AMP}$).

The amplified source voltage ($V_{AMP}$) induces a current through the tank coil 50. As current flows through the tank coil 50, a magnetic field is generated. A secondary coil 56 can be placed in proximity to the magnetic field to induce a current in the secondary coil 56. The current induced in the secondary coil 56 can be utilized to charge the battery 32 and/or power a device. A natural resonant frequency exists due to the arrangement of the tank coil 50 and the tank capacitor 54. When the tank coil 50 and the tank capacitor 54 operate at resonance, variations in frequency are small, thereby increasing the efficiency of the inductive power transfer between the tank coil 50 and the secondary coil 56. By delivering the amplified source voltage ($V_{AMP}$) at a frequency that oscillates approximately at the resonance frequency of the primary LC circuit, an efficient inductive power transfer for charging the battery 32 and/or powering a device can be achieved. Additionally, by controlling the amplitude of ($V_{AMP}$) the power delivered to a secondary coil 56 can compensate for changes in spatial conditions, battery conditions, and differing power demands of various devices according to information communicated in the status signal. Furthermore, the primary LC circuit can maintain the amplitude of oscillation and power at the secondary with fluctuations in the voltage of the energy source.

The resonance control module 40 includes a phase angle prediction module 57, an AC/DC converter module 60, an error module 62, a phase comparator 64, an oscillation module 66, and a conduction angle module 68. The phase angle prediction module 57 includes a sawtooth PNP transistor 70 and a sawtooth capacitor 72 to predict the phase angle of the primary LC circuit 52 during oscillation. The sawtooth capacitor 72 includes a ground end in communication with a reference point and a transistor end in communication with the collector of the sawtooth PNP transistor 70. The voltage across the sawtooth capacitor 72 generates a predicted phase angle signal ($V_{SAW}$). The magnitude of the predicted phase angle signal ($V_{SAW}$) represents the angle of the primary LC circuit 52 sinusoidal oscillation. Although a sawtooth generator is utilized to predict the phase angle of the primary LC circuit 52, another means of predicting the phase angle may be used.

The AC/DC converter module 60 converts the AC (alternating current) voltage signal generated across the tank capacitor 54 into a scaled DC (direct current) voltage signal. Specifically, the AC/DC converter module 60 has an AC/DC input in communication with the tank capacitor 54 for receiving a tank capacitor AC voltage signal ($V_{TANK}$). The AC/DC converter module 60 converts the AC voltage magnitude into a DC voltage. The AC/DC converter module 60 has an AC/DC output for outputting the actual scaled signal ($V_{ACTUAL}$) that indicates the DC tank voltage value of the AC tank voltage of the tank capacitor 54. The AC/DC converter module 60 is particularly fast at converting the AC magnitude to a useful DC signal. The high-speed signal response allows for stable feedback control and also wide tolerance to variations in energy sources and/or supply voltage for charging secondary loads.

The error module 62 generally indicated has an error amplifier 74 with a non-inverting input for receiving the desired resonance amplitude signal ($V_{DESIRE}$). The error amplifier 74 further includes an inverting input for receiving the actual resonance amplitude signal ($V_{ACTUAL}$) indicating the actual oscillation level of a primary LC circuit. The error module 62 computes the difference between the voltage level of the desired resonance amplitude signal ($V_{DESIRE}$) and the voltage level of the actual resonance amplitude signal ($V_{ACTUAL}$). The error module 62 includes an output for outputting an error feedback signal ($V_{ERROR}$) that is influenced by the voltage magnitude difference between ($V_{DESIRE}$) and ($V_{ACTUAL}$). The error feedback signal ($V_{ERROR}$) is used to regulate the amplitude of oscillation of the primary LC circuit 52 in spite of load, supply voltage, and damping disturbances.

The phase comparator 64 generally indicated has an inverting phase input and a non-inverting phase input. The phase comparator 64 includes a phase output in communication with each of the collector of the sawtooth PNP transistor 70 and the transistor end of the sawtooth capacitor 72. The phase comparator 64 selectively operates in a high impedance state and a low impedance state. Specifically, the phase comparator 64 operates in a high impedance state when the sawtooth voltage across the sawtooth capacitor 72 increases. When the voltage across the sawtooth capacitor 72 decreases, the phase comparator 64 operates in a low impedance state.

The oscillation module 66 generally indicated has an oscillation comparator 76. The oscillation comparator 76 has a non-inverting oscillation input and an inverting oscillation input. The non-inverting oscillation input is in communication with each of the error output of the error amplifier 74 and the non-inverting phase input of the phase comparator 64 and a reference voltage. The inverting oscillation input is in communication with the inverting phase input of the phase comparator 64 and with an oscillation output for outputting the pre-amplified source voltage ($V_{PREAMP}$). The LC resonant circuit includes a feedback network that communicates with the oscillation module 66. The feedback network includes a feedback resistor 78, a first feedback capacitor 80, and a second feedback capacitor 82. Specifically, the feedback resistor 78 has one end in communication with one the tank capacitor 54. The feedback resistor 78 has an opposite end in communication with one end of each of the first feedback capacitor 80 and the second feedback capacitor 82. The first feedback capacitor 80 has an opposite end in communication with each of the inverting feedback input of the oscillation module 66 and the inverting phase input of the phase comparator 64. The feedback network provides a signal path for delivering the tank capacitor 54 AC voltage signal ($V_{TANK}$) to the oscillation comparator 76 of the oscillation module 66. The second feedback capacitor 82 has an opposite end in communication with a reference point for filtering the tank capacitor 54 AC voltage signal ($V_{TANK}$).

The conduction angle module 68 (CAM) generally indicated has a conduction angle comparator 84 for comparing the predicted phase angle signal ($V_{SAW}$) with the error feedback signal ($V_{ERROR}$). The conduction angle module 68 includes a non-inverting CAM input and an inverting CAM input. The non-inverting CAM input communicates with the error output of the error module 62 for receiving the error feedback signal ($V_{ERROR}$). The inverting CAM input communicates with the collector of the sawtooth PNP transistor 70 for receiving the predicted phase angle signal ($V_{SAW}$). The conduction angle module 68 has a conduction angle output for outputting a drive termination signal (TERM) to terminate the pre-amplified source voltage ($V_{PREAMP}$) output by the oscillation comparator 76 of the oscillation module 66 when the predicted phase angle signal ($V_{SAW}$) equals the error feedback signal ($V_{ERROR}$). By selectively terminating the pre-amplified source voltage ($V_{PREAMP}$), the resonance control module can selectively energize the primary LC circuit 52 in order to continuously operate the primary LC circuit 52 at the natural resonance frequency and simultaneously and at the desired AC amplitude of oscillation.

Figure 3:
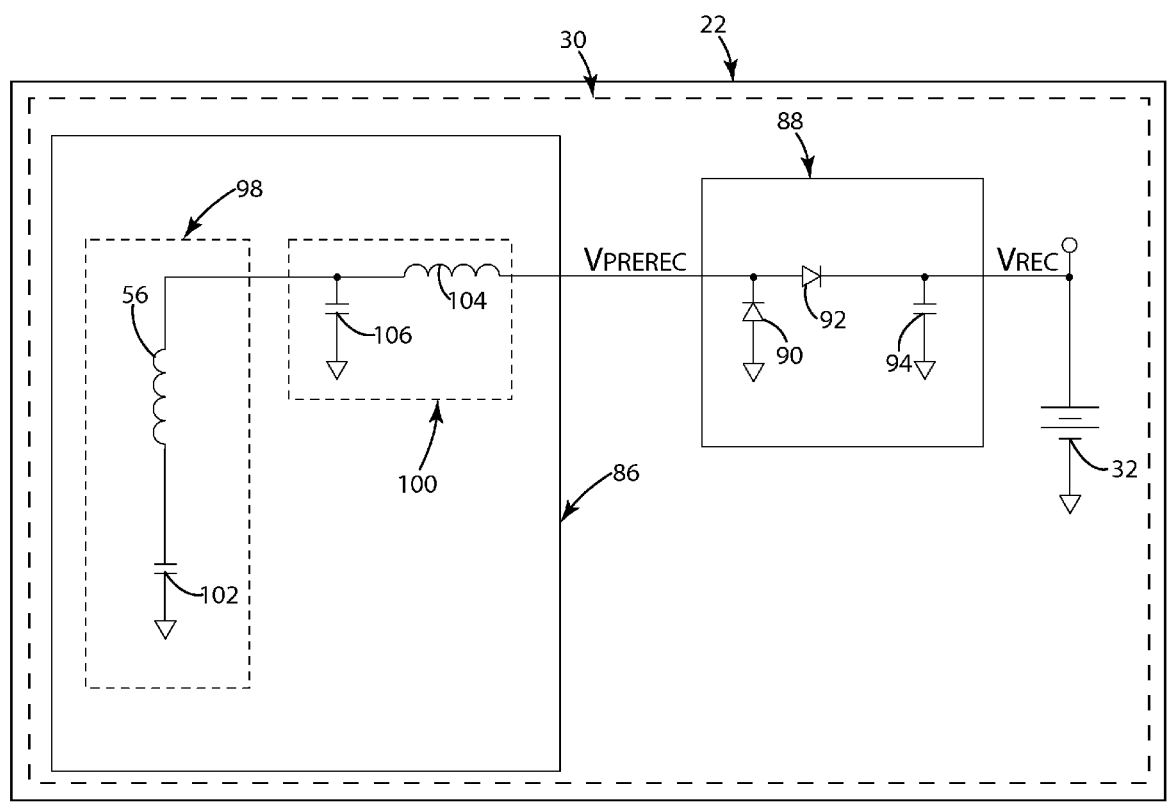
FIG. 3 is detailed electronic circuit schematic of a secondary receiving circuit.

Referring to FIG. 3, the secondary unit 22 is illustrated in greater the detail. The secondary unit 22 includes the secondary receiving system 30. A battery 32 and/or consumer device may be included in the secondary unit 22 for being charged and/or powered by the secondary receiving system 30.

The secondary receiving system 30 includes a secondary coil module 86 and a rectifier module 88. The secondary coil module 86 generally indicated can be disposed in proximity of the primary coil module 38 of the synchronous drive system 26. The synchronous drive system 26 can inductively transfer power to the secondary receiving system 30, which in turn charges a battery 32 and/or powers a consumer device 33, as discussed in greater detail below.

As stated above, the secondary unit 22 may include a battery 32 for powering a consumer device 33. The secondary coil module 86 generates a pre-rectified charging voltage ($V_{pre-rec}$), as discussed in greater detail below. The rectifier module 88 generally indicated communicates with the secondary coil module 86 for rectifying the pre-rectified charging voltage ($V_{pre-rec}$). The rectified charging voltage ($V_{REC}$) is output by the rectifier module 88 and can be used to charge and/or power the battery 32 and/or the consumer device 33. Various rectifier designs may be used including, but not limited to, a half-wave diode rectifier and a full-wave bridge rectifier. An exemplary embodiment of the rectifier module 88 may include a first rectifier diode 90, a second rectifier diode 92, and a rectifier capacitor 94. The anode of the first rectifier diode 90 is in communication with a reference point and the cathode is in communication with secondary coil module 86. The cathode of the second rectifier diode 92 is in communication with the positive terminal of the battery 32 and the anode is in communication with both the cathode of the first rectifier diode 90 and secondary coil module 86. The rectifier capacitor 94 has one end in communication with a reference point and has an opposite end in communication with one end of the second rectifier diode 92 and the positive terminal of the battery 32. The secondary receiving system 30 may further include a status module 96 that communicates with the rectifier module 88 and computes power conditions within the secondary unit 22. The status module 96 outputs a status signal (STATUS) that can indicate the charge status of the battery 32 and/or power status of the device 33.

The secondary coil module 86 includes a secondary LC circuit 98 and an LC filter 100. The secondary LC circuit 98 generally indicated communicates with both the primary LC circuit 52 and the LC filter 100. The secondary LC circuit 98 includes a secondary coil 56 having one end in communication with the rectifier module 88 for being disposed in proximity with the magnetic field to induce a current through the secondary coil 56. The secondary LC circuit 98 generates the pre-rectified charging voltage ($V_{pre-rec}$) that is delivered to the rectifier module 88. The secondary capacitor 102 has one end communicating with a reference point and has an opposite end communicating with one end of the secondary coil 56.

The LC filter 100 generally indicated has a filter coil 104 and a filter capacitor 106. The filter coil 104 has one end in communication with one end of the secondary coil 56, the cathode of the first rectifier diode 90, and the anode of the second rectifier diode 92. The opposite end of the filter coil 104 communicates with one end of the filter capacitor 106. The opposite end of the filter capacitor 106 communicates with a reference point. The LC filter 100 suppresses undesired electrical noise generated by the switching action of the first and second rectifier diodes 90, 92 before delivering the pre-rectified charging voltage ($V_{pre-rec}$) to the rectifier module 88. Additionally, the LC filter 100 inhibits unwanted electromagnetic emission generated by the secondary coil 56 that is typically caused by the sudden changes in diode current flowing through the first and second rectifier diodes 90, 92.

A mutual resonant frequency can be determined based on the component values and the mutual coupling between the primary LC circuit 52 and the secondary LC circuit 98. By operating both the primary LC circuit 52 and the secondary LC circuit 98 at resonance, undesirable EMC emissions that can affect secondary receiving system 30 are reduced. Additionally, operating the primary LC circuit 52 and the secondary LC circuit 98 in mutual resonance improves the power transfer to the secondary receiving system 30 when the coupling between primary and secondary coils 56 is reduced by spatial separation. Further, the improved coupling allows a battery 32 and/or consumer device to be charged and/or powered at greater distances from the primary unit 24.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A synchronous drive system for controlling the amplitude of oscillation in a primary LC circuit comprising;

a primary coil module having a switching coil amplifier communicating with the primary LC circuit for amplifying a pre-amplified source voltage and for outputting an amplified source voltage to the primary LC circuit, a resonance control module communicating with the primary LC circuit and said switching coil amplifier for detecting the natural resonance frequency of the primary LC circuit and for detecting each actual oscillation of the primary LC circuit over an oscillation cycle and for selectively delivering said pre-amplified source voltage to said switching coil amplifier based on the natural resonance frequency of primary LC circuit and each actual oscillation of the primary LC circuit to control the magnitude of each actual oscillation while synchronously operating the primary LC circuit at approximately natural resonance.

2. The synchronous drive system of claim 1 wherein said resonance control module includes an oscillation module for detecting the start of an oscillation cycle of the primary LC circuit and for outputting said pre-amplified source voltage.

3. The synchronous drive system of claim 2 wherein said resonance control module includes a phase angle prediction module for outputting a predicted phase angle signal to represent the phase angle of the sinusoidal oscillation of the natural resonance frequency of the primary LC circuit.

4. The synchronous drive system of claim 3 wherein said resonance control module includes a conduction angle module in communication with said phase angle prediction module for outputting a drive termination signal to terminate said pre-amplified source voltage delivered to said switching coil amplifier.

5. The synchronous drive system of claim 4 wherein said resonance control module includes an AC/DC converter module communicating with the primary LC circuit for detecting an AC amplitude of oscillation of the primary LC circuit and for generating an actual resonance amplitude signal being a scaled DC signal representing the actual magnitude of oscillation of the primary LC circuit.

6. The synchronous drive system of claim 5 wherein said resonance control module includes an error module communicating with said AC/DC converter module for comparing said actual resonance amplitude signal to a predetermined desired resonance amplitude signal and for outputting an error feedback signal.

7. The synchronous drive system of claim 6 wherein said resonance control module includes a conduction angle module in communication with said error module for receiving said error feedback signal and for outputting said drive termination signal when said error feedback signal equals said predicted phase angle signal to regulate the amplitude of oscillation of the primary LC circuit.

8. The synchronous drive system of claim 4 wherein said phase angle prediction module includes a sawtooth generator having a sawtooth PNP transistor and having a sawtooth capacitor.

9. The synchronous drive system of claim 8 wherein said sawtooth capacitor has a ground end in communication with a reference point and has a transistor end in communication with the collector of said sawtooth PNP transistor for outputting a predicted phase angle signal for indicating the sawtooth voltage across said sawtooth capacitor to represent the angle of resonant oscillation of said primary LC circuit.

10. The synchronous drive system of claim 9 wherein said primary coil module includes an EMC filter for filtering electronic noise from said amplified source voltage.

11. The synchronous drive system of claim 10 wherein said EMC filter includes an EMC coil having one end in communication with said primary coil module and including an EMC capacitor having one end in communication with the opposite end of said EMC coil.

12. The synchronous drive system of claim 11 further comprising a primary LC circuit including a tank coil and a tank capacitor with said tank capacitor having one end in communication with a reference point.

13. The synchronous drive system of claim 12 wherein said tank coil has one end in communication with the opposite end of said tank capacitor and having an opposite end in communication with the opposite end of each of said EMC coil and said EMC capacitor for receiving said amplified source voltage for inducing current through said tank coil to generate a magnetic field for generating said magnetic field.

14. The synchronous drive system of claim 13 wherein said AC/DC input of said AC/DC converter module is in communication with said tank capacitor for receiving a tank capacitor AC voltage signal for indicating an AC voltage across said tank capacitor and having an AC/DC output for outputting an actual resonance amplitude signal to indicate a scaled DC tank voltage of said AC tank voltage of said tank capacitor.

15. The synchronous drive system of claim 14 wherein said error module includes an error amplifier with a non-inverting input for receiving said desired resonance amplitude signal and with an inverting input for receiving said actual resonance amplitude signal and with an error output for outputting an error feedback signal for indicating the difference between the voltage level of the desired resonance amplitude signal and the voltage level of the actual resonance amplitude signal.

16. The synchronous drive circuit of claim 15 wherein said oscillation module includes a phase comparator having an inverting phase input and having an non-inverting phase input and having a phase output in communication with each of said collector of said sawtooth PNP transistor and said transistor end of said sawtooth capacitor for operating in one of a high impedance state when said sawtooth voltage across said sawtooth capacitor increases and a low impedance state when said sawtooth voltage across said sawtooth capacitor decreases.

17. The synchronous drive system of claim 16 wherein said oscillation module includes an oscillation comparator with a non-inverting oscillation input in communication with said inverting phase input of said phase comparator and with an oscillation output for outputting said pre-amplified source voltage.

18. The synchronous drive system of claim 17 including a feedback resistor and a first feedback capacitor and a second feedback capacitor for providing a feedback path for said tank capacitor AC voltage signal indicating the actual AC amplitude of oscillation of the primary LC circuit.

19. The synchronous drive system of claim 18 wherein said feedback resistor has one end in communication with one end of each of said tank resistor and said tank capacitor and having an opposite end in communication with one end of each of said first feedback capacitor and said second feedback capacitor.

20. The synchronous drive system of claim 19 wherein said first feedback capacitor has an opposite end in communication with each of said inverting feedback input of said oscillation module and said inverting phase input of said phase comparator for delivering said tank capacitor AC voltage signal to said feedback comparator of said oscillator feedback module.

21. The synchronous drive system of claim 20 wherein said second feedback capacitor has an opposite end in communication with a reference point.

22. The synchronous drive system of claim 21 wherein said conduction angle module includes a conduction angle comparator for comparing said predicted phase angle signal with said error feedback signal.

23. The synchronous drive system of claim 22 wherein said conduction angle comparator includes a non-inverting input in communication with said error output of said error module for receiving said error feedback signal and having an inverting input in communication with said collector of said sawtooth PNP transistor for receiving said predicted phase angle signal and having a conduction angle output for outputting a drive termination signal to terminate said pre-amplified source voltage output by said oscillation comparator of said oscillation module when said predicted phase angle signal equals said error feedback signal to operate said primary LC circuit at resonance.

24. The synchronous drive system of claim 23 further comprising a condition module for computing said predetermined desired resonance amplitude signal.

25. The synchronous drive system of claim 24 further comprising a receiver module communicating with said condition module for communicating a status signal to indicate power conditions in a secondary unit.

26. The synchronous drive system of claim 25 wherein said condition module computes said pre-determined desired resonance amplitude signal based on said status signal.

27. The synchronous drive system of claim 1 further comprising;
a secondary coil module for generating a pre-rectified charging voltage,
a rectifier module in communication with said secondary coil module for rectifying said pre-rectified charging voltage and for outputting a rectified charging voltage to charge a battery,
a status module in communication with said rectifier for outputting said status signal,
a transmitter module in communication with said status module and said receiver module for communicating said status signal to said receiver module,
said secondary coil module including a secondary LC circuit in communication with said primary LC circuit and with said rectifier module,
said secondary LC circuit including a secondary coil having one end in communication with said rectifier module for being disposed proximate said magnetic field to induce a current through said secondary coil for generating said pre-rectified charging voltage,
a secondary capacitor having one end in communication with a reference point and having an opposite end in communication with one end of said secondary coil,
said secondary coil module including an LC filter having a filter coil with one end in communication with one end of said secondary coil and having a filter capacitor with one end in communication with a reference point and with an opposite end connected between the ends of said secondary coil and said filter coil,
said rectifier module including a first rectifier diode and a second rectifier diode and a rectifier capacitor,
said first rectifier diode having the anode in communication with a reference point and having the cathode in communication with one end of said filter coil,
said second rectifier diode having the cathode in communication with the positive terminal of said battery and having the anode in communication with the cathode of said first rectifier diode and one end of said filter coil,
said rectifier capacitor having one end in communication with a reference point and having an opposite end in communication with each of the cathode of said second rectifier diode and the positive terminal of said battery.

28. An inductive power transfer system for inductively transferring power from a primary unit to a secondary unit comprising:
a synchronous drive system having a resonance control module for generating a voltage source and having a primary coil module for generating an electromagnetic field based on said voltage source,
said primary coil module including a primary LC circuit having a natural resonant frequency for generating said magnetic field based on said source voltage,
a secondary receiving system being located in proximity with said synchronous drive system for receiving said magnetic field and for generating a charging voltage for charging a battery,
said resonance control module circuit being in communication with said primary coil module for detecting the resonant frequency of a primary LC circuit and for selectively powering said primary LC circuit based on said desired resonance amplitude signal and an actual resonance amplitude signal to operate said primary LC circuit at the natural resonance frequency.

29. The inductive power transfer system of claim 28 wherein said resonance control module further comprises a sawtooth generator having a sawtooth PNP transistor and including a sawtooth capacitor.

30. The inductive power transfer system of claim 29 wherein said sawtooth capacitor has a ground end in communication with a reference point and has a transistor end in communication with the collector of said sawtooth PNP transistor for outputting a predicted phase angle signal for indicating the sawtooth voltage across said sawtooth capacitor.

31. The inductive power transfer system of claim 30 further comprising a conduction angle module having a conduction angle comparator for selectively outputting a drive termination signal to terminate said source voltage to said primary coil module based on said predicted phase angle signal.

32. The inductive power transfer system of claim 31 wherein said secondary unit includes a battery charged by said secondary receiving circuit.

33. The inductive power transfer system of claim 1 wherein said secondary unit includes a consumer device powered by said secondary receiving circuit.

34. A secondary LC unit for receiving inductively transferred power from a primary LC circuit generating a magnetic field comprising;
a secondary LC circuit having an secondary capacitor and a secondary coil for being placed in proximity to the magnetic field of the primary LC circuit operating at natural resonance for generating a pre-rectified charge voltage,
a LC filter communicating with said secondary coil module for inhibiting electromagnetic emission generated by said secondary module, and
a rectifier module communicating with said LC filter for converting said pre-rectified charge voltage into a rectified charge voltage,
said secondary coil communicating with the primary LC circuit for operating the secondary LC circuit at a mutual resonance with the primary LC circuit to increase the efficiency of power transferred between the primary LC circuit and the secondary LC circuit and for improving special freedom.

35. The secondary LC unit of claim 34 wherein said secondary capacitor includes one end connected to a reference point and includes an opposite end connected in series with one end of said secondary coil.

36. The secondary LC unit of claim 35 wherein said LC filter includes a filter coil having an resonance end for communicating with said secondary coil operating at natural resonance and having a rectifier end for communicating with said rectifier module.

37. The secondary LC unit of claim 36 wherein said LC filter includes a filter capacitor having one end connected to said resonance end of said filter coil and having an opposite end connected to a reference point.

38. The secondary LC unit of claim 27 wherein said rectifier module includes a half-wave diode rectifier having at least one diode communicating with said LC filter.

39. The secondary LC unit of claim 27 where said rectifier module includes a full-wave bridge rectifier having at least one diode communicating with said LC filter.

40. The secondary LC unit of claim 38 further comprising a battery communicating with said rectifier module for charging a battery.

41. The secondary LC unit of claim 38 further comprising a consumer device communicating with said rectifier module for being powered.

* * * * *